United States Patent
Paulk, Jr. et al.

(10) Patent No.: US 11,911,658 B2
(45) Date of Patent: Feb. 27, 2024

(54) GOLF SWING TRAINING DEVICE

(71) Applicant: PD Golf LLC, Dallas, TX (US)

(72) Inventors: James R. Paulk, Jr., Dallas, TX (US); Sumitrajit Dhar, Wilmette, IL (US); Steven J. Iseberg, Schaumburg, IL (US)

(73) Assignee: PD Golf LLC, Dallas, TX (US)

( * ) Notice: Subject to any disclaimer, the term of this patent is extended or adjusted under 35 U.S.C. 154(b) by 0 days.

(21) Appl. No.: 18/319,862

(22) Filed: May 18, 2023

(65) Prior Publication Data

US 2024/0033568 A1 Feb. 1, 2024

Related U.S. Application Data

(63) Continuation of application No. 17/815,125, filed on Jul. 26, 2022, now Pat. No. 11,691,051.

(51) Int. Cl.
| | | |
|---|---|---|
| *A63B 24/00* | (2006.01) | |
| *A63B 69/36* | (2006.01) | |
| *A63B 71/06* | (2006.01) | |

(52) U.S. Cl.
CPC ...... *A63B 24/0003* (2013.01); *A63B 69/3608* (2013.01); *A63B 71/0622* (2013.01); *A63B 71/0686* (2013.01); *A63B 2071/0625* (2013.01); *A63B 2071/0655* (2013.01); *A63B 2071/0694* (2013.01); *A63B 2214/00* (2020.08); *A63B 2220/40* (2013.01); *A63B 2220/836* (2013.01)

(58) Field of Classification Search
CPC ............ A63B 24/0003; A63B 69/3608; A63B 71/0622; A63B 71/0686; A63B 2071/0625; A63B 2071/0655; A63B 2071/0694; A63B 2214/00; A63B 2220/40; A63B 2220/836
See application file for complete search history.

(56) References Cited

U.S. PATENT DOCUMENTS

| | | | |
|---|---|---|---|
| 4,577,868 | A | 3/1986 | Kiyonaga |
| 4,813,436 | A | 3/1989 | Au |
| 5,111,410 | A | 5/1992 | Nakayama et al. |
| 5,118,112 | A | 6/1992 | Bregman et al. |
| 5,372,365 | A | 12/1994 | McTeigue |
| 5,419,562 | A | 5/1995 | Cromarty |
| 5,511,789 | A | 4/1996 | Nakamura |
| 5,697,791 | A | 12/1997 | Nashner et al. |
| 5,826,578 | A | 10/1998 | Curchod |
| 6,001,023 | A | 12/1999 | Sanchez et al. |

(Continued)

FOREIGN PATENT DOCUMENTS

CA 2698078 A1 9/2011

*Primary Examiner* — Jeffrey S Vanderveen
(74) *Attorney, Agent, or Firm* — Thomas | Horstemeyer, LLP

(57) ABSTRACT

Disclosed are various embodiments of a golf training system. In one non-limiting example, a system includes a feedback device, a sensor, and a computing device. The computing device is configured to at least receive sensor data from the sensor during the golf swing of the user and identify a plurality of body movements in which each respective body movement corresponds to a stage of a golf swing sequence based at least in part on the sensor data. The computing device can also be configured to activate a plurality of feedback indicators according to the golf swing sequence for feedback to the user during the golf swing.

20 Claims, 7 Drawing Sheets

(56) References Cited

U.S. PATENT DOCUMENTS

| | | | |
|---|---|---|---|
| 6,050,963 | A | 4/2000 | Johnson et al. |
| 6,778,866 | B1 | 8/2004 | Bettwy |
| 7,376,245 | B2 | 5/2008 | Morozumi et al. |
| 7,527,561 | B2 | 5/2009 | Jang et al. |
| 7,857,708 | B2 | 12/2010 | Ueda et al. |
| 7,905,796 | B2 | 3/2011 | Papa, Jr. |
| 8,043,173 | B2 | 10/2011 | Menalagha et al. |
| 8,636,605 | B2 | 1/2014 | Rose |
| 8,864,597 | B2 | 10/2014 | Kim et al. |
| 8,896,626 | B2 | 11/2014 | Kawai et al. |
| 8,990,054 | B1 | 3/2015 | Ketterling et al. |
| 9,254,430 | B2 | 2/2016 | LaSala |
| 9,827,478 | B1 | 11/2017 | Najafi et al. |
| 9,907,997 | B2 | 3/2018 | Cusey et al. |
| 10,307,640 | B2 | 6/2019 | Mooney |
| 10,383,550 | B2 | 8/2019 | Hyde et al. |
| 10,661,143 | B2 | 5/2020 | Stahl |
| 11,198,051 | B2 | 12/2021 | Paulk, Jr |
| 11,745,083 | B2 * | 9/2023 | Reicher ............... A61B 5/6807 |
| 2003/0017883 | A1 | 1/2003 | Yoshiike |
| 2003/0054327 | A1 | 3/2003 | Evensen |
| 2004/0209698 | A1 | 10/2004 | Ueda et al. |
| 2006/0194178 | A1 | 8/2006 | Goldstein |
| 2009/0227386 | A1 | 9/2009 | Whitaker |
| 2010/0075806 | A1 | 3/2010 | Montgomery |
| 2010/0121228 | A1 | 5/2010 | Stirling et al. |
| 2010/0227738 | A1 | 9/2010 | Henderson |
| 2010/0283630 | A1 | 11/2010 | Alonso |
| 2011/0304497 | A1 | 12/2011 | Molyneux et al. |
| 2012/0322570 | A1 | 12/2012 | Allen |
| 2013/0171596 | A1 | 7/2013 | French |
| 2016/0027325 | A1 | 1/2016 | Malhotra |
| 2016/0202755 | A1 | 7/2016 | Connor |
| 2016/0335913 | A1 | 11/2016 | Grant et al. |
| 2017/0189751 | A1 | 7/2017 | Knickerbocker et al. |
| 2018/0056184 | A1 | 3/2018 | Bentley |
| 2019/0046857 | A1 * | 2/2019 | Sellers, III ......... A63B 69/0024 |
| 2020/0179753 | A1 * | 6/2020 | Redgård ............ A63B 69/3608 |
| 2020/0238149 | A1 * | 7/2020 | Paulk, Jr. ............. A61B 5/6828 |

* cited by examiner

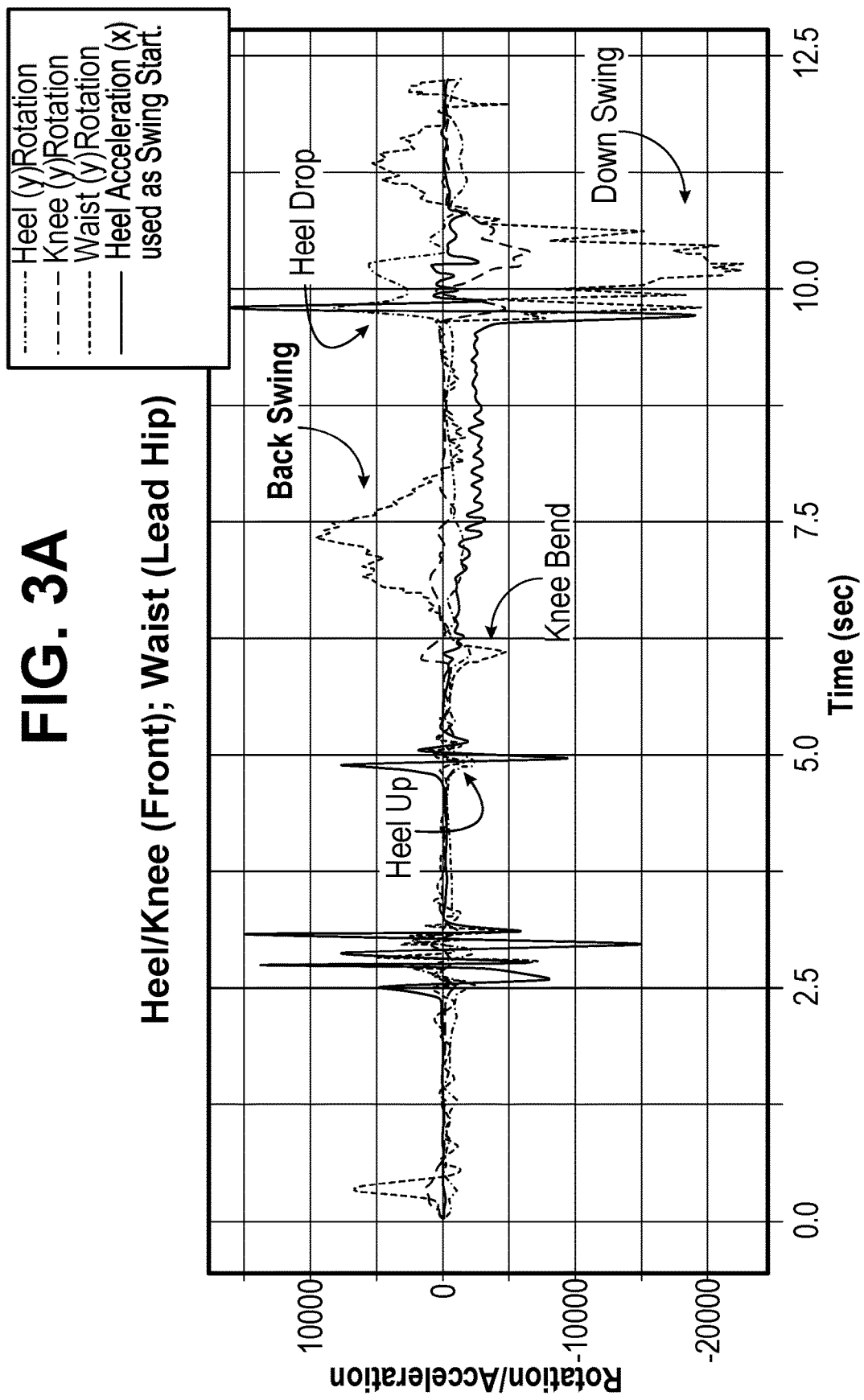

GOLF SWING TRAINING DEVICE

CROSS-REFERENCE TO RELATED APPLICATIONS

This application is a continuatino of and claims the benefit of U.S. patent application Ser. No. 17/815,125, entitled "GOLF SWING TRAINING DEVICES" and filed Jul. 26, 2022, which is hereby incorporated by reference in their entirety.

BACKGROUND

Golf can be a demanding sport. Golf participants enjoy the challenge of consistently executing a proper golf swing for every golf shot. In many cases, golf participants are trained that a proper golf swing includes executing certain body movements. Oftentimes, golfers are taught to focus on upper body elements, such as a particular hand grip, arm movement, and shoulder movement, in order to execute a consistent golf swing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A is a graph that includes various traces of different sensor data during a golf swing, according to one embodiment described herein.

DETAILED DESCRIPTION

Figure 1A:
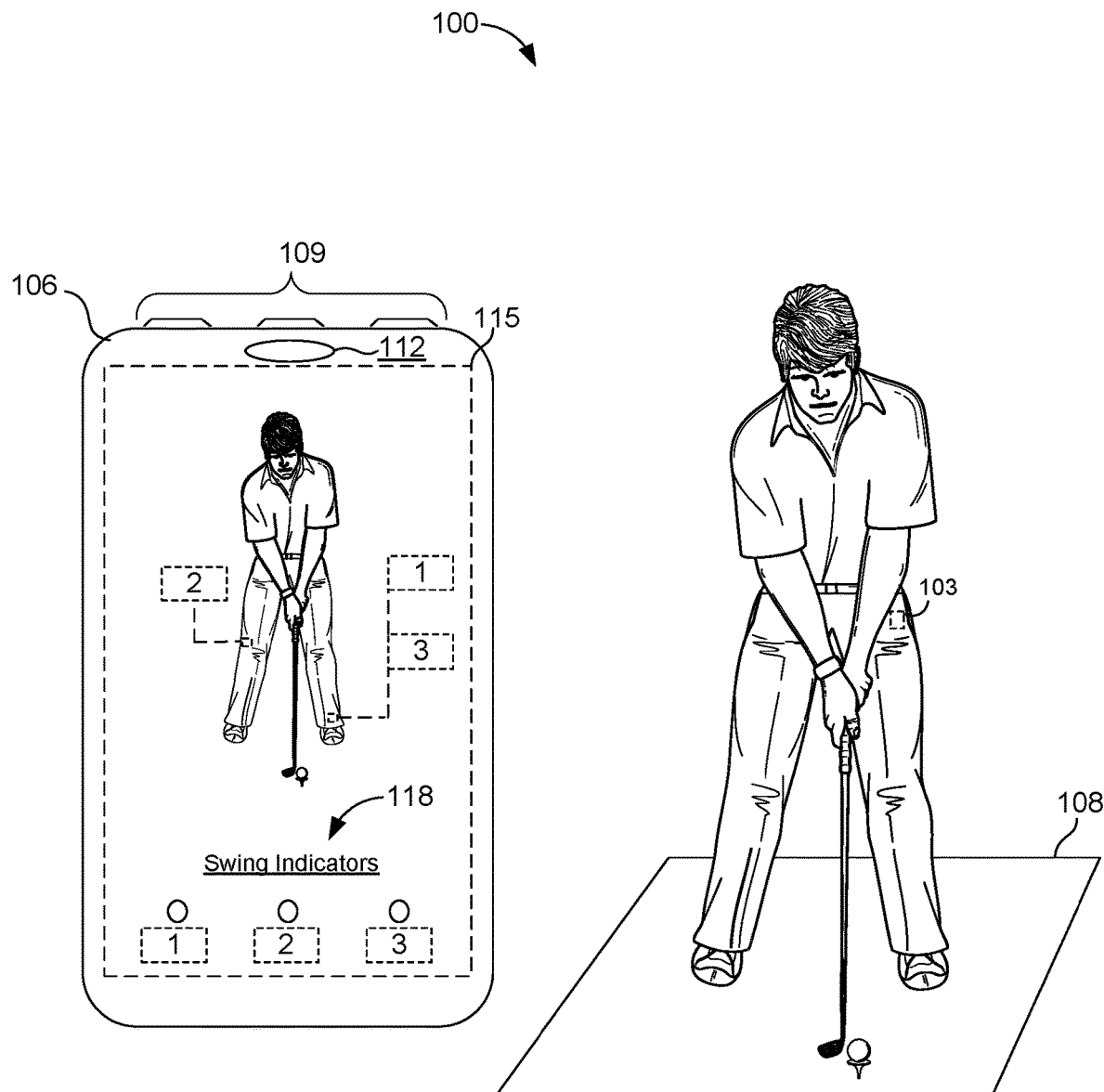
FIG. 1A is a drawing of an example of a golf training system, according to one embodiment described herein.

The embodiments of the present disclosure relate to an improved golf training system. In many respects, golf can be challenging because golf participants can struggle to execute a proper golf swing consistently. Typically, golf participants may receive golf training from private lessons with instructors, instructional books, instructional videos, and other education methods. However, golf participants may find applying golf instructions to their swing to be difficult.

The present disclosure relates to various embodiments of a golf swing training system focused on important movements of the lower body. Complete and coordinated lower body movements are important for the achievement of a consistent, successful golf swing. Incomplete or uncoordinated movements are detrimental. The golf training system can include one or more devices sensing or monitoring certain relevant lower body movements of the golfer during the execution of the swing, together with the generation of appropriate feedback signals. The one or more devices can be used to detect relevant body movements when mounted at or near the movement site. The device or devices can also be used when mounted on the body or clothing at one or more sites other than the sites or places of the relevant movements. Additionally, the embodiments improve upon previous designs because the embodiments reduce the number of sensing devices needed to detect golf swing characteristics at various body locations. For example, a single sensor positioned at the waist area of the golfer can be used to identify whether proper body movements during a golf swing are being performed in the feet, legs (e.g., knees), and other suitable body locations. Additionally, the position of the sensor can vary on the golfer.

In some non-limiting examples, the golf training system can be used in real-time to provide feedback as the golfer is executing a swing. As a result, the golfer will be provided with positive feedback related to the correct achievement of certain key lower body movements. Additionally, the golf training system can be used to identify whether the body movements are being performed in the correct sequence and, for certain movements, with optimal timing.

For instance, a golf participant may struggle with coordinating lower body movements during a backswing and during the transition into a downswing. During the execution of a golf swing, the embodiments of the golf training device can teach a proper sequence of lower body positions and movements by way of a series of progressive feedback signals that are sequentially activated by sensors in real-time or substantially real-time.

As a non-limiting example, a golfer may first determine an imaginary line extending from his or her golf ball to an intended target, which may represent a target line. The golfer may position his or her body with the toes touching a line parallel to the target line, where the golfer is positioned at the proper distance to address the ball in preparation for the swing. The golfer's foot, heel, knee, leg, and hip closest to the target are the Lead Foot, Lead Heel, Lead Knee, Lead Leg, and Lead Hip. The other side of the golfer may be considered as being the Trail Foot, Trail Heel, Trail Knee, Trail Leg, and Trail Hip.

In some example implementations, the embodiments of the golf training system may track the movements of the Lead Heel and the Trail Knee of a golfer to encourage the proper transfer of weight during a golf swing. These tracked movements can be used to identify a transfer of weight to the Trail Leg and Trail Hip during the backswing, to identify whether the weight is being maintained on the Trail Leg and Trail Hip during the backswing, and to identify a transfer of weight forward led by the Lead Heel, Lead Leg, and Lead Hip during a transition into a downswing as well as the accompanying forward rotation of the Lead Hip.

The golf training system can be configured to verify a proper sequence of golf swing movements. For example, the sequence of golf swing movements can include detecting a first state of a raised heel of the Lead Foot, a second state of a bent knee of the Trail Leg and while the heel of the Lead Foot is still elevated, a third state of initiating a backswing, a fourth state of the heel of the Lead Foot being lowered while the knee of the Trail Leg is still bent, and a fifth state of initiating a downswing.

In another example, the golf training system can be set up to verify three stages such as a first stage of raising the heel of the Lead Foot, a second stage of bending the knee of the Trail Leg, and a third stage of the previously raised heel being lowered to initiate a downswing. As such, the relevant stages of lower body movements during a golf swing can be recognized and signaled, so as to help the golfer perceive the totality and sequence of lower body movements in a successful swing. Additionally, the different types of golf swing have different elements of body movement that need to be accomplished and coordinated. For example, a full-swing shot (such as a shot from a distance of more than a few yards), usually requires a weight shift, first to the Trail Foot and Leg and then, immediately before the downswing, to the Lead side of the body, with accompanying rotation of the Lead Hip. A short-game shot from a closer distance may be executed by leaving weight on the Lead Foot and Leg, by flexing the unweighted Trail Knee, and by initiating downswing with a forward rotation of the Lead Hip. A putting stroke, on the other hand, may be optimized with no lower body movement whatsoever. "Weight shift" is an oversimplified designation of the golfer's dynamic adjustment of center of mass to accommodate forces relating to the rotary movements of the golfer's upper body and golf club. In the following discussion, a general description of the system and its components is provided, followed by a discussion of the operation of same.

Beginning with FIG. 1A, shown is a pictorial drawing of a golf training system 100 and a golfer. In some non-limiting examples, the golf training system 100 may be used to track body movements and provide feedback indicators for a proper sequence of movements during a golf swing. The golf training system 100 may include a sensing device 103 and a client device 106. The sensing device 103 may be used to detect and/or track the movements of various body parts of the golfer, such as foot movements, leg movements, knee movements, hip movements, back movements, and movements of other body parts involved in a golf swing.

Additionally, the sensing device 103 can be to indicate different foot positions, leg positions, and other body movements during a golf swing. For example, the sensing device 103 can be used to detect first whether a Lead Heel of the golfer was raised and second whether the knee of the Trailing Leg of the golfer was bent after the raised heel. Then, the sensing device 103 can identify whether the raised heel was lowered after the knee bend.

In FIG. 1A, the sensing device 103 is positioned at the waist or hip area. The sensing device 103 may be attached onto an article of clothing of the golfer (e.g., a belt, pants, etc.). Although only one sensing device 103 is shown, additional sensing devices 103 can be used to increase the accuracy of body movement detections. For example, a second sensing device 103 can be attached to a leg, a knee, a foot, the chest, the back and other suitable areas of the golfer. In some embodiments, an axillary sensing device 108 is embedded in or on an indoor or outdoor floor mat.

The client device 106 can operate as a feedback device that is used to provide feedback indicators to the golfer during the golf swing and a record of swing movements that may be reviewed after the golf swing has been completed. The sensing device(s) 103 can be in data communication with the client device 106. The client device 106 can provide various types of feedback indicators. For example, the client device 106 can include visual indicators 109 for visual cues, a speaker 112 for audible cues, a haptic device for tactile cues, and other suitable indicators that can be recognized for the golfer. In some embodiments, the golf training system 100 can be a single device that includes the functionality of the client device 106 (e.g., providing feedback indicators) and the sensing device 103 (e.g., measuring sensor data).

In some embodiments, the golf training system 100 may also include a display 115. For example, FIG. 1A illustrates the client device 106 having a display 115 with a user interface. After the golfer has completed the swing, the golfer can view swing indicators 118 to represent whether the golfer performed each stage of the golf swing in the correct sequence. In another implementation, the client device 106 can capture video of the golf swing and annotate video frames with swing indicators that have been detected based on feedback from the sensing device 103.

In some embodiments, the user interface rendered in the display 115 can include a golfer in an animated video or a video captured of the golfer during the golf swing. The animated video or the captured video can include annotations for the golf swing indicators 118.

Figures 1B, 1C, 1D:
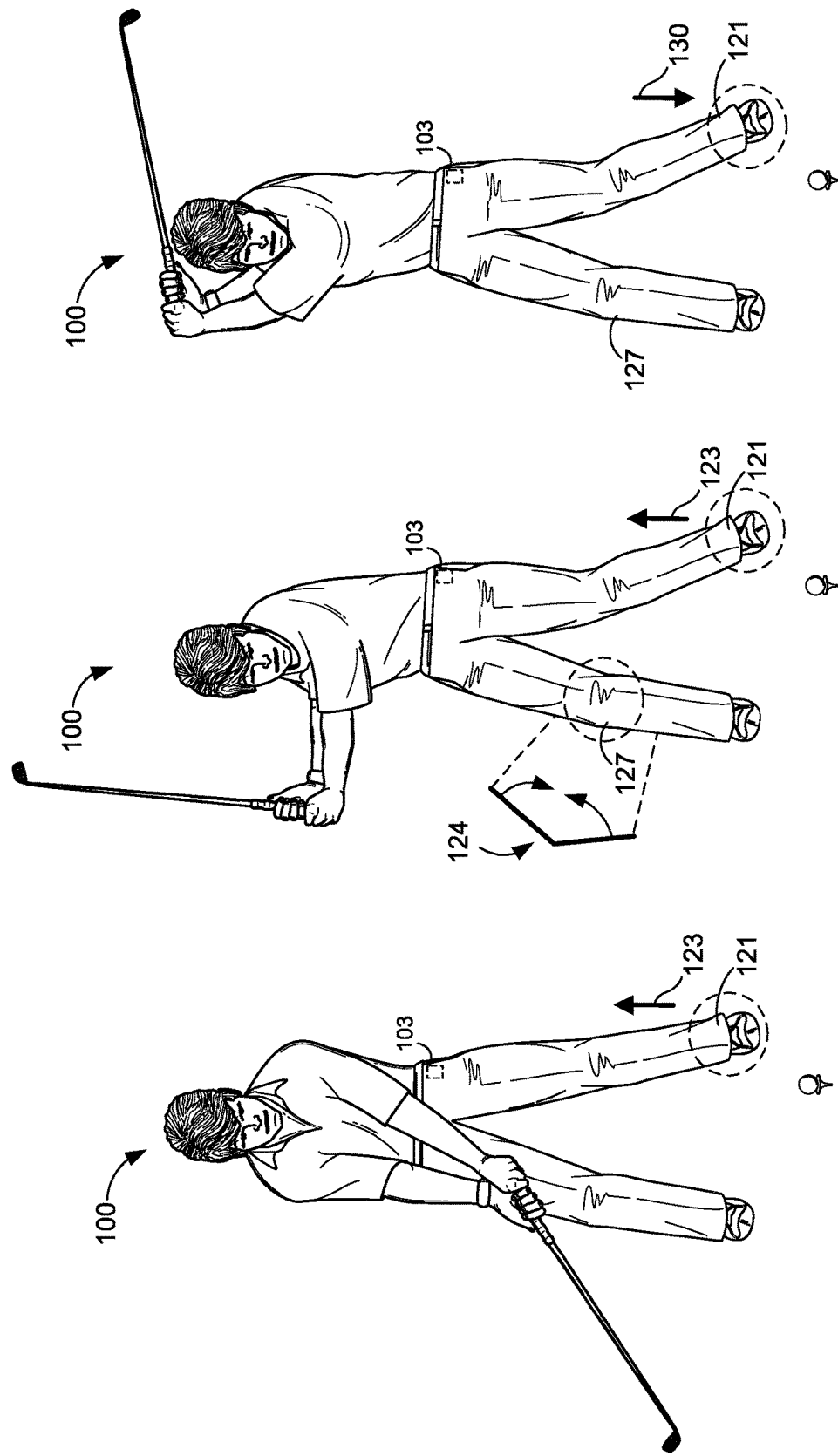
FIGS. 1B through 1D are drawings illustrating different stages of a golf swing monitored by the golf training system in FIG. 1A, according to an embodiment described herein.

Referring next to FIGS. 1A through 1D, shown are a series of drawings of a golfer executing an example sequence of a golf swing at different stages. FIG. 1A illustrates a golfer in an initial stance, where the ball has been addressed. FIGS. 1B through 1D illustrate the remaining stages of the golf swing after FIG. 1A. The sensing device(s) 103 can be used to detect particular movements at each stage of a golf swing. In this non-limiting example, the sensing device 103 is positioned at the waist or hip area of the golfer. The sensing device 103 can be positioned at other locations.

In FIG. 1B, the golfer initiates a backswing of the golf club. As or before the golfer starts to bring the club back, the golfer lifts the heel of his or her Lead Foot 121. In FIG. 1B, reference 123 indicates that the sensing device 103 detects a waist movement that correlates to an upward movement of the heel of the Lead Foot 121. At this stage, the sensing device 103 can transmit the sensor measurement associated with the waist movement to the client device 106. The client device 106 can process the waist movement and generate a first feedback signal to notify the golfer if the first stage of the golf sequence has been performed correctly. The client device 106 can activate the first visual indicator 109 to notify the golfer. In other examples, the client device 106 may activate a first audible sound for the first stage or may activate a haptic device for a first vibration.

In FIG. 1C, the golfer continues with the backswing by bringing the club further around and upward and transferring weight to the Trail Leg. When the backswing begins and as weight is shifted to the Trail Leg, the sensing device 103 may detect a second waist movement that correlates to a degree of bend in the knee of the Trail Leg that meets or exceeds a degree threshold, as indicated by reference 124. In some examples, the sensing device 103 can transmit the sensor data to the client device 106. The client device 106 can generate a second feedback signal to the golfer. In this example, the client device 106 can activate a second visual indicator 109 after determining the sensor data meets a threshold for the second stage of the golf swing sequence. Similar to the first stage, the client device 106 can activate one or more of a second visual indicator 109, a second audible sound from a speaker 112, a second vibration from a haptic device, or other methods of notifications. Additionally, the client device 106 ensures that the first stage has been completed before activating an indicator for the second stage. Accordingly, the client device 106 ensures that the heel on the Lead Foot 121 is raised first. Then, the client device 106 ensures that the knee 127 on the Trail Leg remains bent while the heel of the Lead Foot 121 remains raised.

In some embodiments, the client device 106 can identify whether the heel of the Lead Foot 121 has remained raised by monitoring for adverse body movements. For example, the sensing device 103 may detect a first waist movement that corresponds to the raised heel lowering. If the sensing device 103 detects a second waist movement that correlates to lowering the raised heel before the second stage (e.g., a knee bend), then the sensing device 103 or the client device 106 can determine an adverse body movement has occurred because the body movements occurred out of order for the golf swing sequence.

In FIG. 1D, the golfer transitions from a backswing to initiate a downswing toward the ball. At this stage, the sensing device 103 may detect a waist movement that correlates to the raised heel moving downward, as indicated by reference 130. The downward movement of the heel represents a commencement of the transfer of weight from the Trail side to the Lead side of the golfer. The sensing device 103 can transmit sensor data related to the waist movement to the client device 106. The sensing device 103 and/or the client device 106 can verify if the first stage and the second stage have been completed. Additionally, the sensing device 103 and/or the client device 106 can check if an adverse body movement has occurred (e.g., the heel was lowered early, the knee was straightened early, or the hips moved out of position in relation to the ball). If all of the conditions are met for the third stage, then the client device 106 can activate a third indicator. Similar to the first and second stage, the client device 106 can transmit a third feedback indicator to notify the golfer that the third stage has been completed correctly. The third feedback indicator can be adjusted to provide a time lag after the Lead Heel replacement and for a threshold of detected Lead Hip rotation after Lead Heel replacement.

Figure 2:
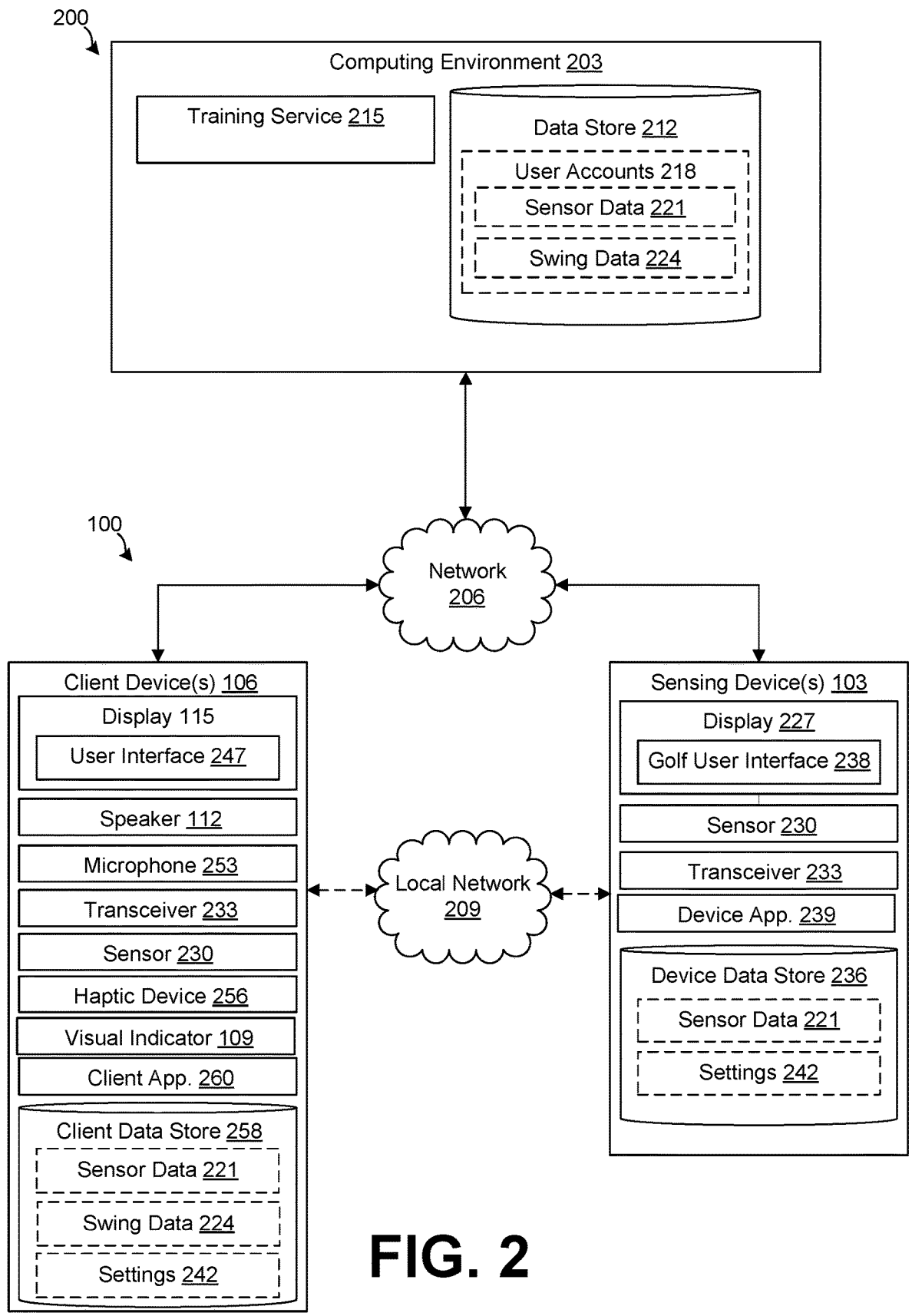
FIG. 2 is a drawing of a network environment, according to one embodiment described herein.

With reference to FIG. 2, shown is a networked environment 200 according to various embodiments. The networked environment 200 includes a computing environment 203 and a golf training system 100, which are in data communication with each other via a network 206. The network 206 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The golf training system 100 can include the client device 106 and/or the sensing device 103. The golf training system 100 is used to track body movements of a golfer and provide feedback indicators to the golfer during a golf swing. A history of the activated feedback indicators can be reviewed by the golfer later. The client device 106 and the sensing device 103 can also be in data communication via the network 206 or via the local network 209.

The local network 209 can be wired or wireless communication. The local network 209 can include a personal area network, a peer-to-peer network, a mesh network, and other suitable local networks. Some examples of a local network can include Bluetooth®, Zigbee®, Infrared Wireless, Z-Wave, 6LoWPAN, WiFi, and other local networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. Each computing device can include at least one processor, memory (e.g., one or more data stores), an interface, and other suitlabe components. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, a training service 215, and other applications, services, processes, systems, engines, or functionality not discussed in detail herein. The training service 215 is executed to facilitate the tracking of body movements of a golfer and to facilitate providing feedback indicators.

The data stored in the data store 212 includes, for example, user accounts 218, and potentially other data. The user account 218 can include sensor data 221, swing data 224, and other suitable data. The sensor data 221 can represent golf swing movement data that is received from the sensing device 103 and/or the client device 106. The golf swing movement data can include data collected from one or more body locations. For example, the data can be collected from the waist, the feet, the legs, the back, and other suitable locations. The swing data 224 can represent data associated with swing characteristics of the golfer or data that is derived from the sensor data 221. For example, the swing data 224 can include statistics associated with the sensor data 221 or the feedback indicators that were triggered.

The sensing device 103 can be representative of one or more devices that are used to capture body movement data of a golfer during a golf swing. In some examples, the sensing device 103 can also provide feedback indicators to the golfer, in which the client device 106 may be omitted. The sensing device 103 can be attached to various locations of the golfer, such as the waist area, the feet, the legs, the shoulder, the back, and other suitable locations. The sensing device 103 can also be attached to an article of clothing of the golfer, such as placed in a side pocket, attached to a belt, a waist band, embedded in a golf shoe, and other suitable locations.

The sensing device 103 can include a display 227, a sensor 230, a transceiver 233, a device data store 236, and other suitable components. The display 227 can be used to display a golf user interface 238 that can display feedback indicators. In some examples, the display227 can be omitted from the sensing device 103. The sensor 230 can include a sensing unit that is capable of measuring movement of the golfer during a golf swing. Some non-limiting examples of a sensor 230 can include an accelerometer, a gyroscope, a device that includes functionality of an accelerometer and a gyroscope, and other suitable sensors. The sensor 230 can measure movement data in six axes. For example, the axes can include an X axis, a Y-axis, and Z-axis of a Cartesian coordinate system. Each axis of the Cartesian coordinate system can have an acceleration axis and a rotation axis of measurement. One or more axes can be used by the sensing device 103 and/or the golf training system 100 to detect body movements and provide feedback indicators.

The transceiver 233 can represent one or more devices used for data communication over the local network 209 or the network 206. The one or more devices of the transceiver 233 can be used for wired or wireless data communications. In some embodiments, the sensing device 103 can also include devices for providing feedback indicators, such as a hepatic device for generating tactile notifications, a visual indicator (e.g., Light emitting diodes), a speaker for audible notifications, and other feedback devices.

Various applications and/or other functionality may be executed in the sensing device 103 according to various embodiments. For example, a device application 239 can be executed by the sensing device 103. The device application 239 can be executed to measure data on a golfer during a golf swing. The device application 239 can control the sensor 230 for capturing sensor data 221. In some implementations, the device application 239 can process the sensor data 221 in order to trigger feedback indicators. In other implementations, the device application 239 can also communicate the sensor data 221 to the client device 106 for processing and/or activating feedback indicators.

Also, various data is stored in the device data store 236 that is accessible to the sensing device 103. The device data store 236 can include the sensor data 221 and the settings 242. The sensor data 221 can represent data that is captured during a golf swing from the one or more sensors attached to the golfer. The settings 242 can represent one or more configurations set by the user. For example, the configurations can include sensor configurations, swing settings, and other potential settings. For example, the sensor configuration can represent setting a threshold for triggering a feedback indicator, such as an amount of rotation, acceleration, or distance required for a heel to move.

Another example of a configuration can include a selection of a type of golf swing to verify the sequence of golf body movements. For example, the sensing device 103 can be configured to monitor a putting swing, a short game swing, a full-swing shot, and other suitable swing types. Each swing type can be associated with a different sequence of targeted body movements for verifying against the golfer's swing.

The client device 106 is representative of a device that may be coupled to the network 206 or the local network 209. The client device 106 may comprise, for example, a processor-based system such as a computer system. Such a computer system may be embodied in the form of a mobile device, desktop computer, a laptop computer, personal digital assistants, cellular telephones, smartphones, smart watches, music players, web pads, tablet computer systems, game consoles, electronic book readers, or other devices with like capability. The client device 106 may include a display 115. The display 115 may comprise, for example, one or more devices such as liquid crystal display (LCD) displays, gas plasma-based flat panel displays, organic light emitting diode (OLED) displays, or other types of display devices, etc. The display 115 can be used to present a user interface 247. The user interface 247 can be used to activate feedback indicators and configure settings 242.

The client device 106 can include the sensor 230, the transceiver 233, a speaker 112, a microphone 253, a haptic device 256, visual indicator(s) 109, the client data store 258 and other suitable components. The microphone 253 can be used for capturing audio commands from the golfer. The haptic device 256 can be used for generating feedback indicators, such as vibration notifications.

The client device 106 may be configured to execute, via one or more processors of the client device 106, various applications such as a client application 260 and/or other applications. The client application 260 may be executed in a client device 106, for example, to access network content served up by the computing environment 203 and/or other servers, thereby rendering a user interface 247 on the display 115. To this end, the client application 260 may comprise, for example, a browser, a dedicated application, etc., and the user interface 247 may comprise a network page, an application screen, etc. The client device 106 may be configured to execute applications beyond the client application 260 such as, for example, email applications, social networking applications, word processors, spreadsheets, and/or other applications.

Also, various data is stored in the client data store 258 that is accessible to the client device 106. The client data store 258 includes the sensor data 221, the swing data 224, the settings 242, and other suitable data.

Next, a general description of the operation of the various components of the networked environment 200 is provided. To begin, in one non-limiting example, the golf training system 100 includes the sensing device 103 and the client device 106. The sensing device 103 may have an attachment clip for clipping onto a waist band or a belt of the golfer's clothes. In this example, the client device 106 can be a smartphone device that is in data communication with the sensing device 103 via the local network 209 or via the network 206.

In this example, the golfer can configure the settings 242 for the next golf swing. For instance, the golfer can configure on the client device 106 that the next golf swing will be full-swing shot. The full-swing shot setting 242 can be communicated to the sensing device 103. The full-swing shot setting 242 can include data of the golf swing sequence that needs to be verified during the next golf swing. In this example, the golf swing sequence may include three stages. The first stage is detecting the raised heel of the Lead Foot. The second stage is detecting the knee bend in the trailing leg while the Lead Foot is raised, and the third stage is detecting the raised heel being lowered and related hip rotation. Other golf swing settings 242 may include a different number of stages to verify.

The golfer can address the golf ball by positioning their feet and golf club at the desire locations. The golfer can initiate a "start swing" signal to the sensing device 103. The "start swing" signal notifies the sensing device 103 to begin recording sensor data 221 because the golfer is about to start the golf swing. The "start swing" signal can be activated from a button on the sensing device 103 or the client device 106. In other scenarios, the "start swing" signal can be detected as a unique body movement captured by the sensor 230 (e.g., a foot tap). For instance, the sensor 230 can identify a waist movement that is correlated to a foot tap movement.

Then, the golfer can begin a golf swing movement. As or before the golfer starts to bring the club back, the golfer lifts his or her heel. The sensor 230 can capture sensor data 221 that includes a first waist movement that is correlated to the raised heel (e.g., see FIG. 1B). The client device 106 can receive the sensor data 221 in real-time or substantial real-time from the sensing device 103. The client device 106 can identify the first waist movement. The client device 106 can activate a first audible sound for the golfer. The first audible sounds informs the golfer that the first stage of the golf swing sequence was performed correctly.

Next, as the golfer further brings the golf club back into the backswing, a second waist movement is detected that corresponds to a bent knee in the Trailing leg of the golfer (e.g., see FIG. 1C). After receiving the sensor data 221 that includes the second waist movement, the client device 106 can activate a second audible sound for the golfer.

Then, the golfer can transition to a downswing (e.g., see FIG. 1D). The sensing device 103 can capture sensor data 221 of the raised heel being lowered. After receiving the sensor data 221, the client device 106 can identify a third waist movement that is correlated to the raised heel being lowered. The client device 106 can activate a third audio sound in response to identifying the third waist movement. Such activation can be adjusted for optimal timing and for achievement of a threshold of detected hip rotation.

In another non-limiting example, the sensing device 103 and/or the client device 106 can be configured to generate a metronomic signal of an adjustable frequency via the speaker 112. For example, metronomic signal may be in the range of 50-80 beats per minute, independently of the cycle of swing movements that are detected. The metronomic signal may be useful to provide an audible rhythm sound that can be useful during a golf swing. For instance, the metronomic signal can be used as an aid to the development of a relaxed putting stroke. It is undesirable for the golfer's body to move during the putting stroke, so the sensing device 103 (or the client device 106) could also be programmed to interrupt or discontinue the metronomic signal in the event the golfer's body moves during the putting stroke.

In another non-limiting example, the sensing device 103 and/or the client device 106 can be embodied as a smart watch (e.g., Apple Watch®, Fitbit Sense®, etc.) or a wrist wearable device for the golfer. In this example embodiment, the smart watch has sensors 230 for detecting body movements. The smart watch can function independently or be paired with a sensing device 103 (e.g., positioned at the waist or other suitable locations) for correlation of movements. The smart watch can communicate with the sensing device 103 via the local network 209 (e.g., Bluetooth®) or the remote network 206.

With reference to FIG. 3A, shown is a graph that includes various traces of different sensor data 221 during a golf swing. As previously described, the embodiment of the golf training system 100 reduces the number of sensors needed for tracking various body movements during a golf swing. FIG. 3A illustrates a graph of three sensors 230 attached to a golfer during a golf swing. The three sensors are positioned at a heel, a knee, and a waist of the golfer. FIG. 3A illustrates that certain waist movements (e.g., a waist movement signature) can be correlated to body movement at a certain stage of the golf swing. For example, a particular waist movement during the "Heel Up" stage can be correlated to the golfer's heel raising, as indicated by the heel trace. Accordingly, instead of using a heel sensor to detect a heel raising, a sensor in the waist area can be used to identify the heel raising. A particular waist movement detected from the waist sensor can be corelated to a heel movement from the heel sensor. Additionally, other waist movements can be correlated with other body movements in the golf swing. As a result, another waist movement can be correlated to a knee bend stage, a heel drop stage, and other suitable body movements in the golf swing, such as hip rotation. In some examples, the swing data 224 can include a mapping of particular waist movements to each stage of the golf swing.

Figure 3B:
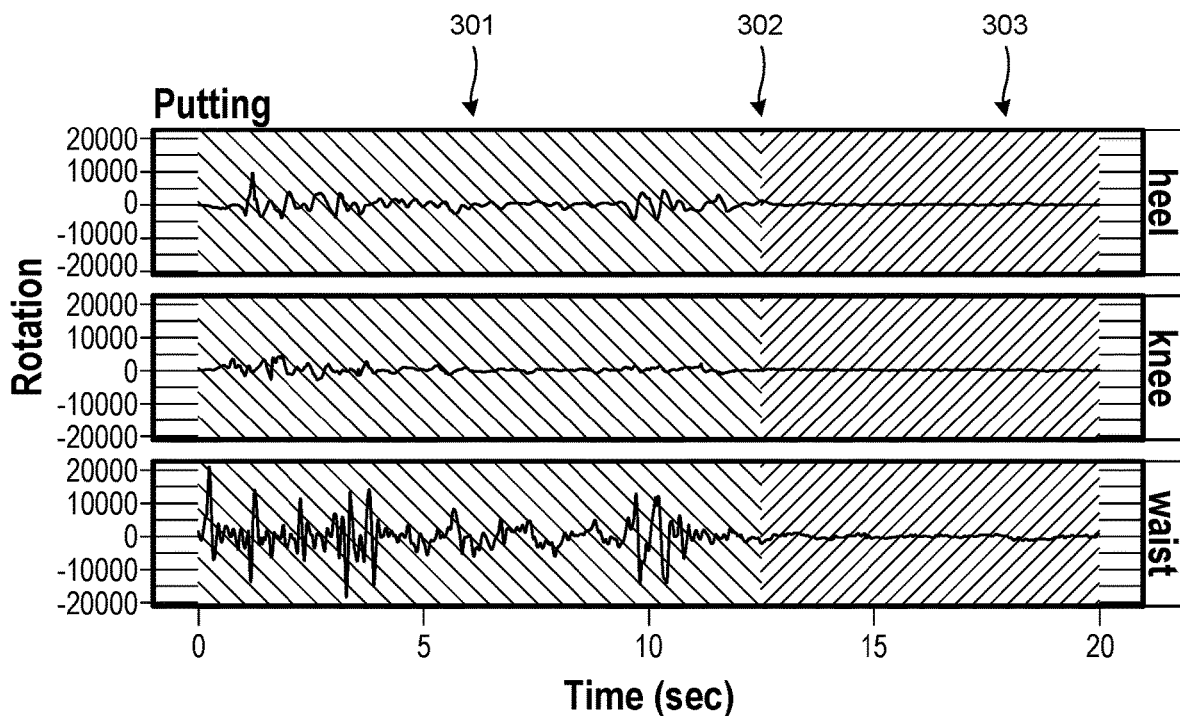
FIGS. 3B and 3C are graphs that include various traces of different sensor data during a putting golf swing, according to one embodiment described herein.
Figure 3C:
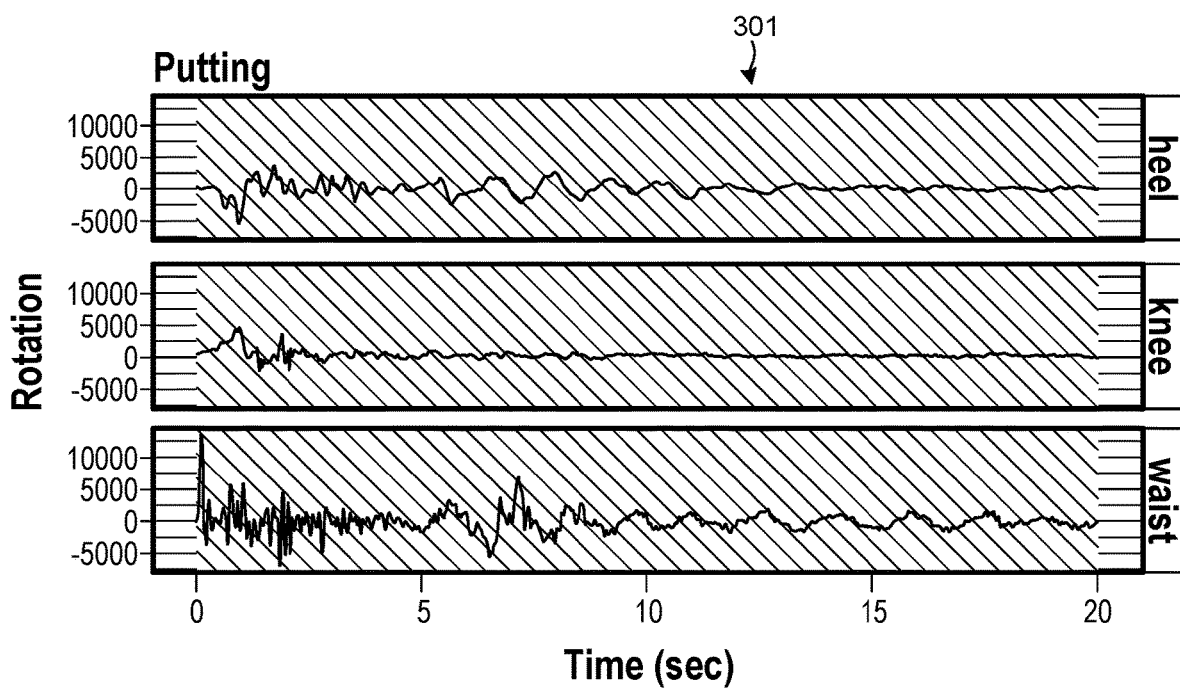

Moving on, FIGS. 3B and 3C each include a set of three graphs of sensor measurements of body movements during a putting sequence. The sensor measurements include measurements from a heel sensor 230, a knee sensor 230, and a waist sensor 230. When the next golf swing type is identified as a putting swing, the device application 239 (or the client application 260) can configure one or more sensors 230 to monitor for a proper putting setup. In some examples, a proper putting setup can involve detecting no or little movement in the lower body of the golfer. For example, for a putting swing, the device application 239 can set a threshold (e.g., a particular value) of minimal movement before the putting sequence begins.

In this non-limiting example, FIG. 3B illustrates a first zone 301, a transition point 302, and a second zone 303. The first zone 301 represents a noisy state where the waist sensor 230 is detecting a high amount of body movement (e.g., exceeding the threshold). The transition point 302 represents a transition from the first zone 301 to the second zone 303. The second zone 303 represents a quite state where the wait sensor 230 is detecting a minimal amount of movement by the waist sensor 230. The transition point 302 and the second zone 303 can represent that the sensor measurements are below the threshold. In some embodiments, the sensor measurements need to be below the threshold for a particular amount of time.

As a result, the device application 239 (or the client application 260) can provide an indication to proceed with the putting swing. Accordingly, FIG. 3B shows a proper putting sequence as a first example. In FIG. 3B, the golfer is given a first feedback signal related to the first zone 301. This first feedback signal indicates that the golfer should not begin the putting swing because there is too much body movement for a proper putting swing. After the golfer reduces their body movement, the transition point 302 is detected and a second feedback signal is given to proceed with the putting swing because there is minimal movement detected by the waist sensor 230 (e.g., below a threshold measurement). The minimal movement detected by the waist sensor 230 corresponds to a minimal amount movement that is detected by the knee sensor 230 and the heel sensor 230 of the golfer. As such, one sensor 230 is sufficient for detecting the amount of body movement in the lower body.

While the golfer is receiving the first feedback signal for the first zone 301, the golfer will know to focus on minimizing movement in the lower body. As shown, the feedback pattern or indication can change in the second zone 303 as the sensor measurements are "quiet enough." The feedback pattern in this second zone 303 can be configured at the golfer's option to give the metronomic signal referenced above. Thus, the golfer can proceed to start the putting swing. If the sensors 230 start detecting movement (e.g., above the threshold) again after the transition point 302, the feedback pattern can change to suggest that the putt be aborted. Additionally, FIG. 3C illustrates that the feedback pattern or indicators remain in the first zone 301 because the waist sensor measurements are never "quiet enough." As such, the golfer is not given an indication to proceed with the putting swing.

Figure 4:
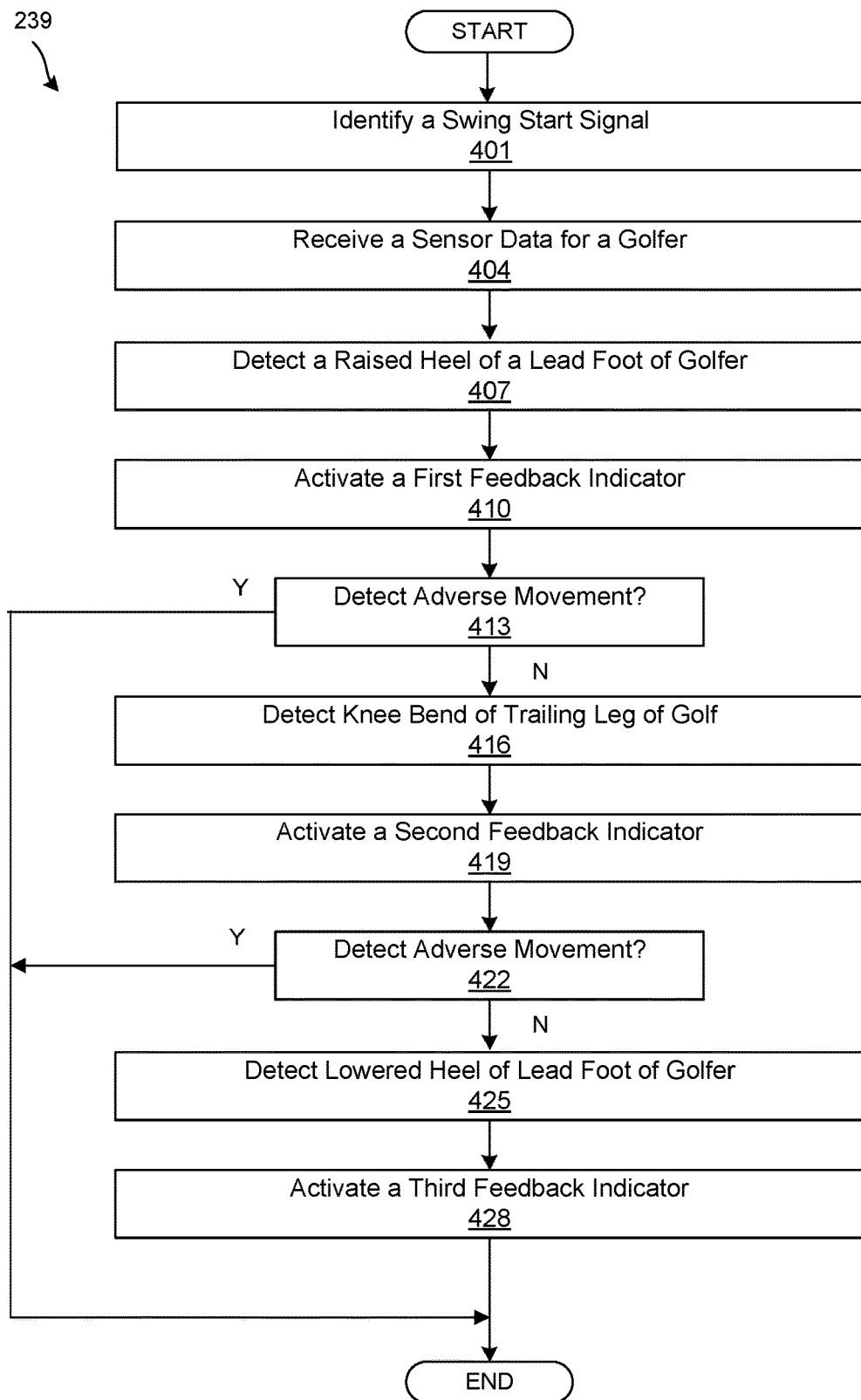
FIG. 4 is a flowchart illustrating one example of functionality implemented as portions of an application executable in the golf training system of FIG. 2, according to various embodiments of the present disclosure.

Referring next to FIG. 4, shown is a flowchart that provides one example of the operation of a portion of the device application 239 according to various embodiments. It is understood that the flowchart of FIG. 4 provides merely an example of the many different types of functional arrangements that may be employed to implement the operation of the portion of the device application 239 as described herein. As an alternative, the flowchart of FIG. 4 may be viewed as depicting an example of elements of a method implemented in the computing environment 203 (FIG. 2) according to one or more embodiments. Additionally, the functionality of the flowchart of FIG. 4 can be executed by other devices, such as the client device 106.

Beginning with box 401, it is assumed that the sensor 230 is mounted on a waist area of the golfer. The device application 239 can identify a "start swing" signal to begin a golf swing. In some examples, the "start swing" signal can be triggered from a user interface element clicked on by a user or a button pressed. In other instances, the "start swing" signal can be initiated from a particular movement captured in the sensor data 221. For instance, the device application 239 can identify a certain waist movement that corresponds to a double foot tap. Accordingly, these different approaches can be used to notify the device application 239 that the golfer is about to start a golf swing.

In box 404, the device application 239 can begin receiving sensor data 221 from the sensor 230 for a golf swing. In some examples, the device application 239 can select or filter the sensor data 221 to in order to focus on one or more axis measurements. For example, the sensor 230 can provide sensor data 221 in six axes of measurements for movements performed by the golfer during the golf swing. From the six axes of measurements, the device application 239 can select one or more axes of analysis. For instance, the device application 239 can select the rotation measurement in the y-axis for a sensor 230 positioned at the waist of the golfer. The axis measurement can be preselected or can be selected based on the placement location of the sensor 230.

Additionally, the device application 239 can select or filter the sensor data 221 based on a selection of a golf swing type. From the golf user interface 238, a user can select the golf swing type. For example, the golfer can select that the next golf swing is going to be a full-swing shot, a short game shot, a putt, or another suitable golf shot. After receiving the selection of the golf swing type, the device application 239 can identify a golf swing sequence of body movements during the golf swing. For instance, the golf swing sequence for the full-swing shot golf profile may have three stages of body movements to verify. In contrast, the short game golf profile may have three or less stages to verify during the golf swing. Each stage can involve detecting one or more targeted body movements in a sequence according to the swing type selected by the golfer. Some non-llimiting examples of targeted body movements for detection in a sequence can include a raised heel for the Lead Foot of the golfer, a bent knee for the Trail Leg of the golfer, lowering of the raised Lead Heel of the Lead Foot, and other suitable targeted body movements associated with each swing type.

In box 407, the device application 239 can identify a waist movement that is correlated to the first stage of the golf swing type. For example, assuming the selected golf swing type is a full-swing shot, the first stage of the golf swing sequence is a raised heel. The waist movement identified for the raised heel can amount to a movement signature for the raised heel. Additionally, the waist movement can be identified based at least in part on the waist movement meeting a threshold. For example, the waist movement can be compared to a baseline measurement to determine if the difference meets the threshold, such as two standard deviations for the threshold.

In box 410, the device application 239 can activate a first feedback indicator in response to the detection of the first waist movement. In some embodiments, the first feedback indicator is configured to provide the first feedback indicator in real-time to the golfer during the golf swing. For example, the device application 239 can provide an audible notification via a speaker 112, a visual cue indicator via a visual indicator 109 (e.g., a light emitting diode), or a vibration notification via a haptic device 256.

In box 413, the device application 239 can determine if an adverse movement has been detected by the sensor 230. The adverse movements can represent that movements that interfere with the golf swing sequence or movements that are out of order. For example, an adverse movement at this stage may include lowering the raised heel before the next stages. Thus, the device application 239 can identify a waist movement that corresponds to the adverse movement (e.g., lowering the raised heel early). If an adverse movement is detected, then the device application 239 proceeds to the end. If an adverse movement is not detected, then the device application 239 proceeds to box 416 to detect the next stage in the golf swing sequence.

In box 416, the device application 239 can identify a next waist movement that is correlated to the second stage of the golf swing type. Continuing with the previous example, the second stage is detecting a knee bend in the Trailing Leg of the golfer. The waist movement identified for the knee bend can amount to a movement signature for the bent knee. Additionally, the waist movement can be identified based at least in part on the waist movement meeting a threshold for the knee bend. For example, the waist movement can be compared to a baseline measurement to determine if the difference meets the threshold, such as two standard deviations can be set as the threshold.

In box 419, the device application 239 can activate a second feedback indicator in response to the detection of the second waist movement. In some embodiments, the second feedback indicator is configured to provide the second feedback indicator in real-time to the golfer during the golf swing. Similar to box 410, the device application 239 can activate various types of feedback indicators to the golfer.

In box 422, the device application 239 can determine if an adverse movement has been detected by the sensor 230. The adverse movements can represent that movements that interfere with the golf swing sequence. For example, an adverse movement at this stage may include lowering the raised heel before the next stages or straightening the knee early. Thus, the device application 239 can identify a waist movement that corresponds to one of various the adverse movements (e.g., lowering the raised heel, straightening the knee early, or other movements). If an adverse movement is detected, then the device application 239 proceeds to the end. If an adverse movement is not detected, then the device application 239 proceeds to box 425 to detect the next stage in the golf swing sequence.

In box 425, the device application 239 can identify a next waist movement that is correlated to the third stage of the golf swing type. Continuing with the previous example, the third stage is detecting a lowering of the raised heel in the front foot of the golfer. The waist movement identified for lowering the raised heel can amount to a movement signature for lowering the raised heel. Additionally, the waist movement can be identified based at least in part on the waist movement meeting a threshold for lowering the raised heel.

In box 428, the device application 239 can activate a third feedback indicator in response to the detection of the third waist movement. In some embodiments, the third feedback indicator is configured to provide the third feedback indicator in real-time to the golfer during the golf swing. Similar to box 410, the device application 239 can activate various types of feedback indicators to the golfer. Then, the device application 239 proceeds to the end.

Figure 5:
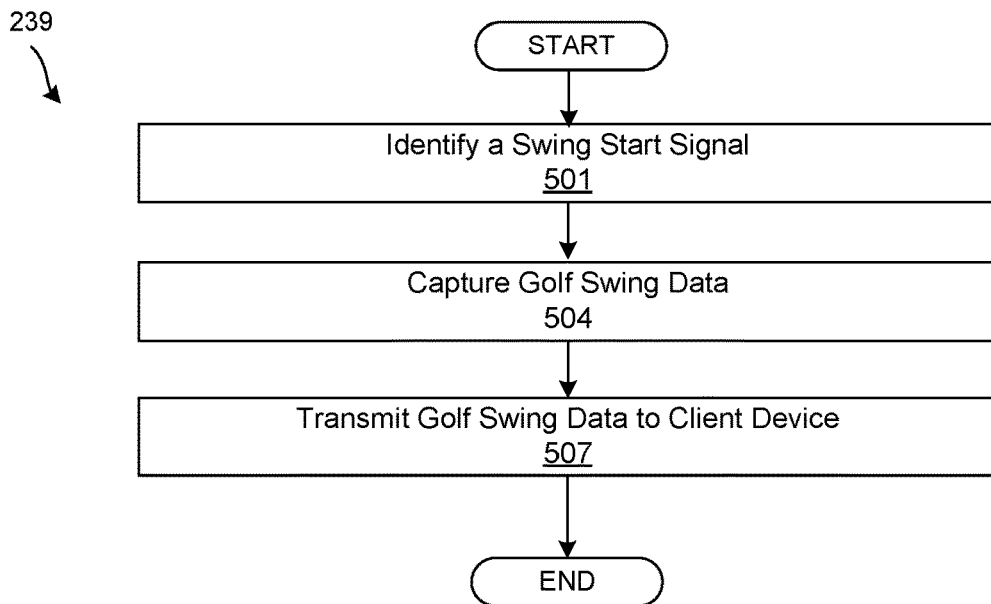
FIG. 5 is a flowchart illustrating one example of functionality implemented as portions of an application executable in the golf device of FIG. 2, according to various embodiments of the present disclosure.

Referring next to FIG. 5, shown is a flowchart that provides one example of the operation of a portion of the device application 239 according to various embodiments. It is understood that the flowchart of FIG. 5 provides merely an example of the many different types of functional arrangements that may be employed to implement the operation of the portion of the device application 239 as described herein. As an alternative, the flowchart of FIG. 5 may be viewed as depicting an example of elements of a method implemented in the computing environment 203 (FIG. 2) according to one or more embodiments.

Beginning with box 501, it is assumed that the sensor 230 is mounted on a waist area of the golfer. The device application 239 can identify a "start swing" signal to begin a golf swing. In some examples, the "start swing" signal can be triggered from a user interface element clicked on by a user or a button pressed by the user. In other instances, the "start swing" signal can be initiated from a particular movement captured in the sensor data 221. For instance, the device application 239 can identify a certain waist movement that corresponds to a double foot tap. Accordingly, these different approaches can be used to notify the device application 239 that the golfer is about to start a golf swing.

In box 504, the device application 239 can begin receiving sensor data 221 from the sensor 230 for a golf swing. In some examples, the device application 239 can select or filter the sensor data 221 in order to focus on one or more axis measurements. For example, the sensor 230 can provide sensor data 221 in six axes of measurements for movements performed by the golfer during the golf swing. From the six axes of measurement, the device application 239 can select one or more axes of analysis. For instance, the device application 239 can select the rotation measurement in the y-axis for a sensor 230 positioned at the waist of the golfer. The axis measurement can be preselected or can be selected based on the placement location of the sensor 230.

Additionally, the device application 239 can select or filter the sensor data 221 based on a selection of a golf swing type. From the golf user interface 238, a user can select the golf swing type. For example, the golfer can select that the next golf swing is going to be a full-swing shot, a short game shot, or a putt. After receiving the selection of the golf swing type, the device application 239 can identify a golf swing sequence of body movements to check for during the golf swing. For instance, the golf swing sequence for the full-swing shot golf profile may have three stages of body movements to verify. In contrast, the short game golf profile may have three or less stages to verify during the golf swing.

In box 507, the device application 239 can transmit the sensor data 221 to the client device 106. The client device 106 can process the sensor data 221 to determine whether the feedback indicators should be activated. The sensor data 221 can be used by the client device 106 to detect the different stages of the golf swing sequence and to determine if adverse movements have occurred. Then, the device application 239 proceeds to the end.

Figure 6:
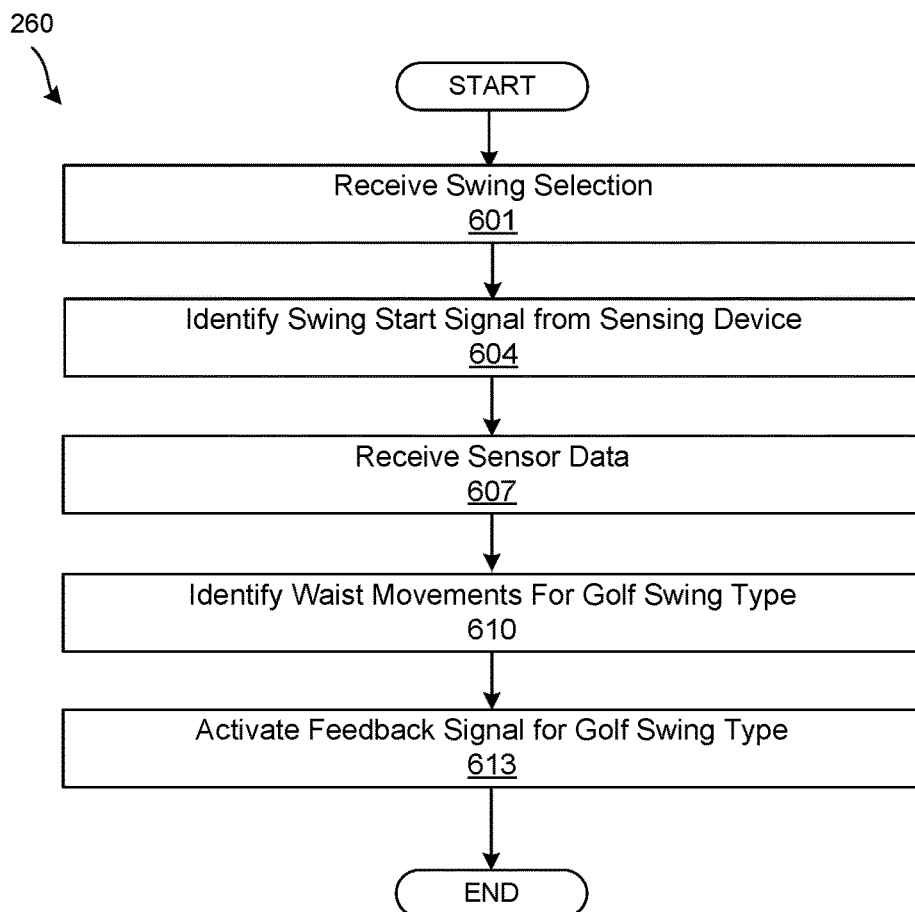
FIG. 6 is a flowchart illustrating one example of functionality implemented as portions of an application executable in the client device of FIG. 2, according to various embodiments of the present disclosure.

Referring next to FIG. 6, shown is a flowchart that provides one example of the operation of a portion of the client application 260 according to various embodiments. It is understood that the flowchart of FIG. 6 provides merely an example of the many different types of functional arrangements that may be employed to implement the operation of the portion of the client application 260 as described herein. As an alternative, the flowchart of FIG. 6 may be viewed as depicting an example of elements of a method implemented in the computing environment 203 (FIG. 2) according to one or more embodiments.

Beginning with box 601, the client application 260 can receive a selection of a swing type. For example, the golfer can select a full-swing shot or a short game shot as the next golf shot. After the swing type is selected, the client application 260 can retrieve a golf swing sequence associated with the swing type. In some examples, the client application 260 can communicate settings 242 (e.g., sensor settings, golf swing sequence, swing type, etc.) to the sensing device 103. The golf swing sequence can include different body movements that be identified to correspond to each stage of the golf swing sequence. For example, a golf swing sequence for a particular golf swing type may include a first waist movement for a first swing stage, a second waist movement for a second swing stage, and a third waist movement for a third swing stage. The client application 260 will look for these waist movements to verify each stage of the golf swing sequence.

In box 604, the client application 260 can identify a swing start signal. The swing start signal can be activated from a user selecting a button on a display or pushing a physical button. In other examples, the sensing device 103 can transmit a swing start signal after identifying a body movement that is set to indicate the beginning of a golf swing.

In box 607, the client application 260 can receive sensor data 221 from the sensing device 103. The sensor data 221 may be filtered to include one or more selected axes of measurement.

In box 610, the client application 260 can identify waist movements that correlate to certain body movements in the golf swing sequence, as was discussed earlier in reference to FIG. 3. In other examples, the sensing device 103 may be positioned on another location of the golfer. For example, instead of the waist area, the sensing device 103 may be positioned on a leg. Accordingly, the leg movement can be identified and correlated to certain stages of the golf swing sequence. For instance, a particular leg movement can be correlated to a raised heel, a knee bend, a lowering of the raised heel, and other suitable golf swing movements.

In box 613, the client application 260 can activate feedback indicators for each stage of the golf swing sequence. The feedback indicators can be activated in real-time or substantially real-time as the body movements are detected. The client application 260 can also consider adverse body movements that may interfere with the golf swing sequence. Then, the client application 260 proceeds to the end.

Additionally, the computing environment 203 includes one or more computing devices. Each computing device includes at least one processor circuit, for example, having a processor and a memory, both of which are coupled to a local interface. To this end, each computing device may comprise, for example, at least one server computer or like device. The local interface may comprise, for example, a data bus with an accompanying address/control bus or other bus structure as can be appreciated.

Stored in the memory are both data and several components that are executable by the processor. In particular, stored in the memory and executable by the processor is the training service 215, and potentially other applications. Also stored in the memory may be a data store 212 and other data. In addition, an operating system may be stored in the memory and executable by the processor.

It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system for detecting golf swing movements, comprising:
 a sensor configured to be positioned on a user, the sensor being configured to capture a plurality of targeted movements during a golf swing of the user;
 a feedback device configured to provide feedback to the user during the golf swing, the feedback device comprising a processor and memory, the feedback device being in data communication with the sensor; and
 machine instructions stored in the memory, wherein the machine instructions, when executed, cause the feedback device to at least:
  receive sensor data from the sensor during the golf swing of the user;
  identify a first detected movement of a swing sequence that corresponds to a first Lead Foot movement of the user during the golf swing based at least in part on the sensor data;
  activate a first feedback indicator during the golf swing based at least in part on the first detected movement;
  identify a second detected movement of the swing sequence that corresponds to a knee movement of a Trail Leg of the user during the golf swing based at least in part on the sensor data;
  activate a second feedback indicator during the golf swing based at least in part on the second detected movement and the activation of first feedback indicator for the first detected movement;
  identify a third detected movement of the swing sequence that corresponds to a second Lead Foot movement from the first Lead Foot movement during the golf swing based at least in part on the sensor data; and
  activate a third feedback indicator during the golf swing based at least in part on the third detected movement and the activation of second feedback indicator for the second detected movement.

2. The system of claim 1, wherein the machine instructions stored in the memory, wherein the machine instructions, when executed, cause the feedback device to at least:
 identify a start swing signal based at least in part on the sensor data or a selection on a user interface of the feedback device; and
 generate a metronomic signal based at least in part on the start swing signal.

3. The system of claim 2, wherein the machine instructions stored in the memory, wherein the machine instructions, when executed, cause the feedback device to at least:
 discontinue the metronomic signal based at least in part on at least one of an occurrence of an adverse body movement, the activation of the third feedback indicator, an expiration of a determined time period, or the swing sequence being turned off by the user.

4. The system of claim 2, wherein the metronomic signal has an audible frequency that is configured to be adjusted by the user.

5. The system of claim 1, wherein the sensor comprises at least one of an accelerometer or a gyroscope.

6. The system of claim 1, wherein the first detected movement, the second detected movement, or the third detected movement are identified based at least in part on an axis measurement from the sensor data meeting a threshold.

7. The system of claim 1, wherein the sensor comprises a first sensor and a second sensor, wherein the first sensor is located at a first position on the user and the second sensor is located at a second position on the user.

8. The system of claim 1, wherein at least one of the first detected movement, the second detected movement, and the third detected movement are identified based at least in part on a selection of at least one axis of measurement associated with the sensor.

9. The system of claim 1, wherein the sensor is a wrist wearable device or a component thereof.

10. The system of claim 1, wherein the machine instructions stored in the memory, wherein the machine instructions, when executed, cause the feedback device to at least:
identify a particular detected movement that indicates a starting point for the golf swing based at least in part on the sensor data.

11. The system of claim 1, wherein the first feedback indicator is at least one of a speaker, a haptic device, or a visual indicator device.

12. A method for detecting a sequence of golf swing movements, comprising:
receiving, by a computing device, sensor data from a sensor during a golf swing of a user, the sensor being situated on the user to capture a plurality of body movements of the user;
identifying, by the computing device, a first detected movement of a swing sequence that corresponds to a first Lead Foot movement of the user during the golf swing based at least in part on the sensor data;
activating, by the computing device, a first feedback indicator during the golf swing based at least in part on the first detected movement;
identifying, by the computing device, a second detected movement of the swing sequence that corresponds to a knee movement of a Trail Leg of the user during the golf swing based at least in part on the sensor data;
activating, by the computing device, a second feedback indicator during the golf swing based at least in part on the second detected movement and the activation of first feedback indicator for the first detected movement;
identifying, by the computing device, a third detected movement of the swing sequence that corresponds to a second Lead Foot movement from the first Lead Foot movement during the golf swing based at least in part on the sensor data; and
activating, by the computing device, a third feedback indicator during the golf swing based at least in part on the third detected movement and the activation of second feedback indicator for the second detected movement.

13. The method of claim 12, further comprising:
identifying, by the computing device, a start swing signal based at least in part on the sensor data or a selection on a user interface for the computing device; and
generating, by the computing device, a metronomic signal based at least in part on the start swing signal.

14. The method of claim 13, further comprising:
interrupting, by the computing device, the metronomic signal based at least in part on an occurrence of an adverse body movement, the activation of the third feedback indicator, an expiration of a determined time period, or the swing sequence being turned off by the user.

15. The method of claim 13, wherein the metronomic signal has an audible frequency that is configured to be adjusted by the user.

16. The method of claim 12, wherein the sensor device comprises at least one of an accelerometer or a gyroscope.

17. The method of claim 12, wherein the first detected movement, the second detected movement, or the third detected movement are identified based at least in part on an axis measurement from the sensor data meeting a threshold.

18. The method of claim 12, wherein the computing device comprises at least one of a display, a haptic device, or a speaker.

19. The method of claim 12, wherein at least one of the first detected movement, the second detected movement, and the third detected movement are identified based at least in part on a selection of at least one axis of measurement associated with the sensor.

20. The method of claim 19, wherein the selection of the at least one axis of measurement is based at least in part on a placement location of the sensor on a body of the user, wherein the sensor is placed at least one of a shoulder, a back, a waist, a leg, a wrist, or a foot.

* * * * *